United States Patent [19]

Sherrill

[11] 4,053,755
[45] Oct. 11, 1977

[54] PEDOMETER DISTANCE-MEASURING DEVICE

[76] Inventor: John C. Sherrill, 547 W. Southern Hills Road, Phoenix, Ariz. 85023

[21] Appl. No.: 714,768

[22] Filed: Aug. 16, 1976

[51] Int. Cl.² .................. G01C 22/00; G06F 15/02
[52] U.S. Cl. .................. 364/561; 235/92 CP; 235/105
[58] Field of Search .......... 235/151.32, 156, 152, 235/150.2, 92 MT, 92 DN, 92 DE, 92 PE, 92 CP, 95 R, 96, 97, 105; 73/490; 33/1 R

[56] References Cited

U.S. PATENT DOCUMENTS

| | | | |
|---|---|---|---|
| 3,965,340 | 6/1976 | Renner et al. | 235/151.32 |
| 3,635,399 | 1/1972 | Dahlquist et al. | 235/105 |
| 3,895,356 | 7/1975 | Kraus | 235/151.32 X |
| 3,898,437 | 8/1975 | Butler | 235/95 R |
| 3,955,073 | 5/1976 | Carew et al. | 235/151.32 |

Primary Examiner—Joseph F. Ruggiero
Attorney, Agent, or Firm—Drummond, Nelson & Ptak

[57] ABSTRACT

An electronic pedometer is constructed by a combination of a calculator of the hand-held type and a weighted balance switch closed in response to the strides taken by the person wearing or carrying the pedometer. The stride-actuated switch is connected in parallel with the contacts of a function key of the calculator, such as the "add" or "subtract" key. The distance covered by the wearer in a normal stride is entered in a conventional fashion into the calculator by operation of the appropriate data entry keys. Then, each time a step is taken by the user, this data is added or subtracted (in accordance with the function selected by the user) to continuously provide an indication of the distance traveled or distance remaining to be traveled. Alternatively, the calculator may be used to provide a unit count of each step taken and this total then may be multiplied in the calculator by a constant corresponding to the average distance of each step taken by the user.

8 Claims, 8 Drawing Figures

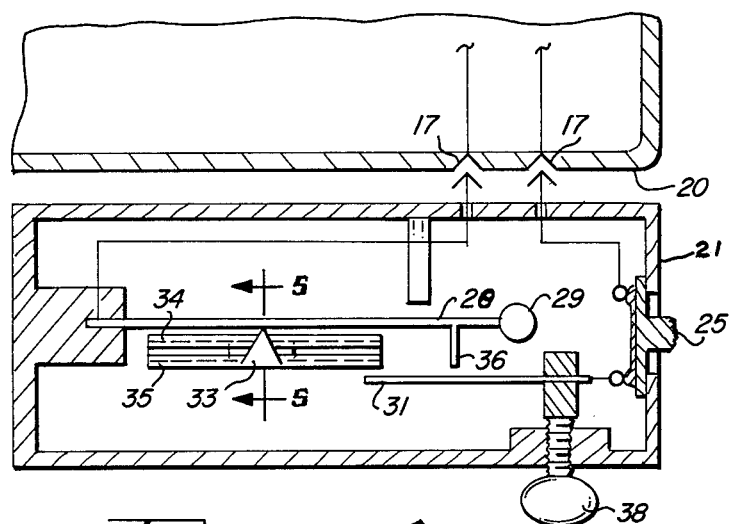
FIG-4
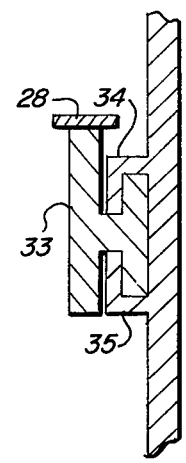
FIG-5
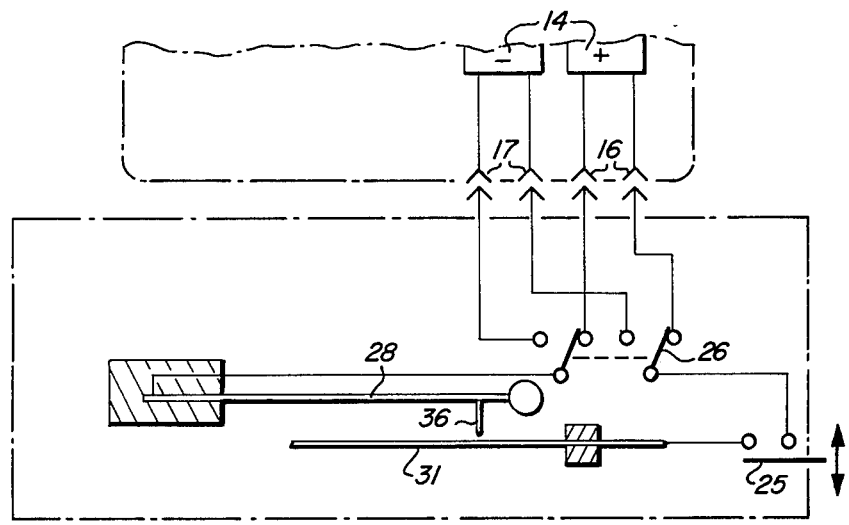
FIG-6
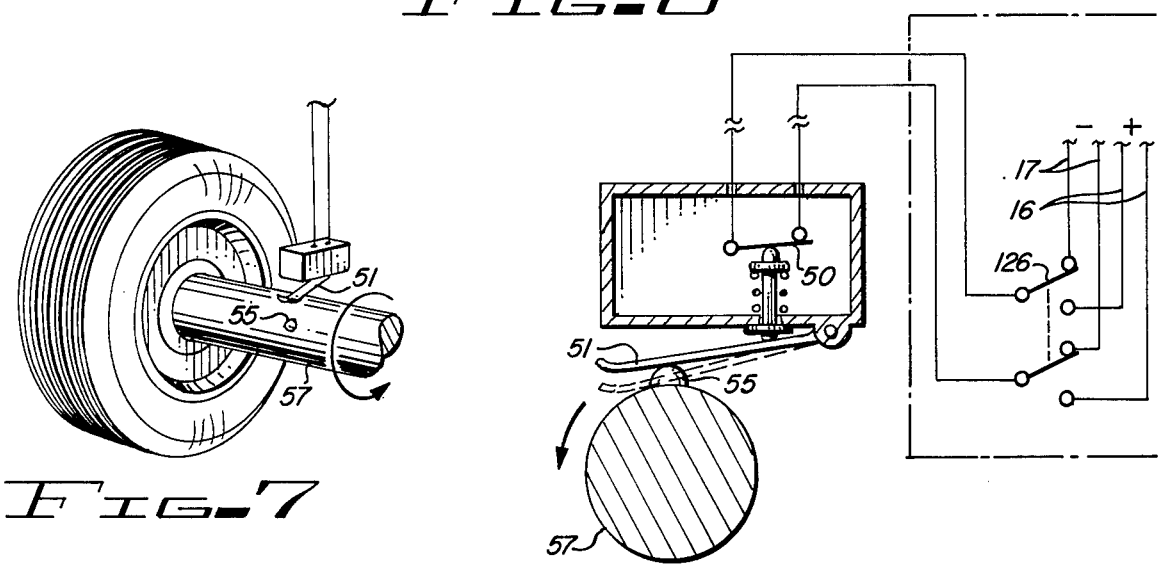
FIG-7
FIG-8

PEDOMETER DISTANCE-MEASURING DEVICE

BACKGROUND OF THE INVENTION

In many occupations and recreational endeavors, a need exists for persons to be able to measure distances covered by walking or running from one point to another. For example, golfers and hikers often desire to know how far they have walked from a certain starting point or landmark and how much distance remains to an ultimate destination or intermediate point. In addition, real estate salesmen, particularly those who are engaged in commercial and industrial real estate and farm and ranch sales, often need to know with a relatively high degree of accuracy the distance across a warehouse, for example, or the length of a field and the like.

Various types of pedometers or other distance-measuring instruments have been available for indicating distances covered or distances from one point to another. Generally, pedometers which are carried on the person involve a mechanical pawl and ratchet arrangement operated under control of a weighted spring mechanism to provide a predetermined rotation or count with each step made by the person wearing the pedometer. An adjustment of the pedometer initially is made for the individual using it to cause the output reading to be indicative of the distance covered by the strides of that individual. The accuracy of such mechanical pedometers, however, is relatively poor and generally must be related to miles or tenths of a mile rather than to yards or feet over a relatively long distance. This accuracy is inadequate for golfers who are interested in accuracy within a yard or two over distances of 200 to 500 yards. Similarly, for a real estate salesman desiring to quickly obtain the dimensions of a room or a building, a much higher degree of accuracy is required than is presently obtainable from commercially available pedometers.

In addition, it is desirable to provide a pedometer which is capable of adding, with a high degree of accuracy, the distance covered by each step to give a continuous indication of the total distance covered or, alternatively, capable of subtracting from a preset distance the distance covered by each step; so that the user has an indication of the distance remaining to be traveled.

It also is desirable to obtain an accuracy with a pedometer within one or two feet over distances as much as several hundred yards and, further, it is desirable to have a capability of resetting a pedometer easily in a short period of time to adjust its operation to accommodate the strides of different persons.

SUMMARY OF THE INVENTION

Accordingly, it is an object of this invention to provide an improved distance-measuring device.

It is another object of this invention to provide an improved pedometer.

It is a further object of this invention to provide an improved electronic pedometer.

It is still another object of this invention to provide an improved electronic pedometer utilizing a combination of an electronic calculator and stride-actuated switching mechanism.

It is an additional object of this invention to provide an improved distance-measuring device utilizing an electronic calculator as an integral part thereof.

In accordance with a preferred embodiment of this invention, a distance-measuring device includes an electronic calculator for entering predetermined data in response to input pulses. A pulse-supply switching circuit is connected in parallel with the contacts of one of the keys of the electronic calculator to supply input pulses to the calculator in response to units of distance covered.

In a more specific embodiment, the electronic calculator comprises a hand-held calculator with a keyboard having some data entry keys and function keys which additionally includes a step-actuated switch connected in parallel across the contacts of one of the function keys to simulate operation of the key in response to impact movement imparted to the switch, so that the calculator enters data under control of the switch.

BRIEF DESCRIPTION OF THE DRAWINGS

FIG. 4 is a cut-away detail view of a portion of the device shown in FIGS. 1, 2 and 3;

FIG. 5 is a cross-sectional view taken along the lines 5—5 of FIG. 4;

FIG. 6 is a schematic diagram of the switching circuitry of the device shown in FIGS. 1, 2 and 3;

FIG. 7 illustrates an alternative embodiment of the device; and

FIG. 8 is a detailed schematic representation of the alternative embodiment represented in FIG. 7.

DETAILED DESCRIPTION

Figure 1:
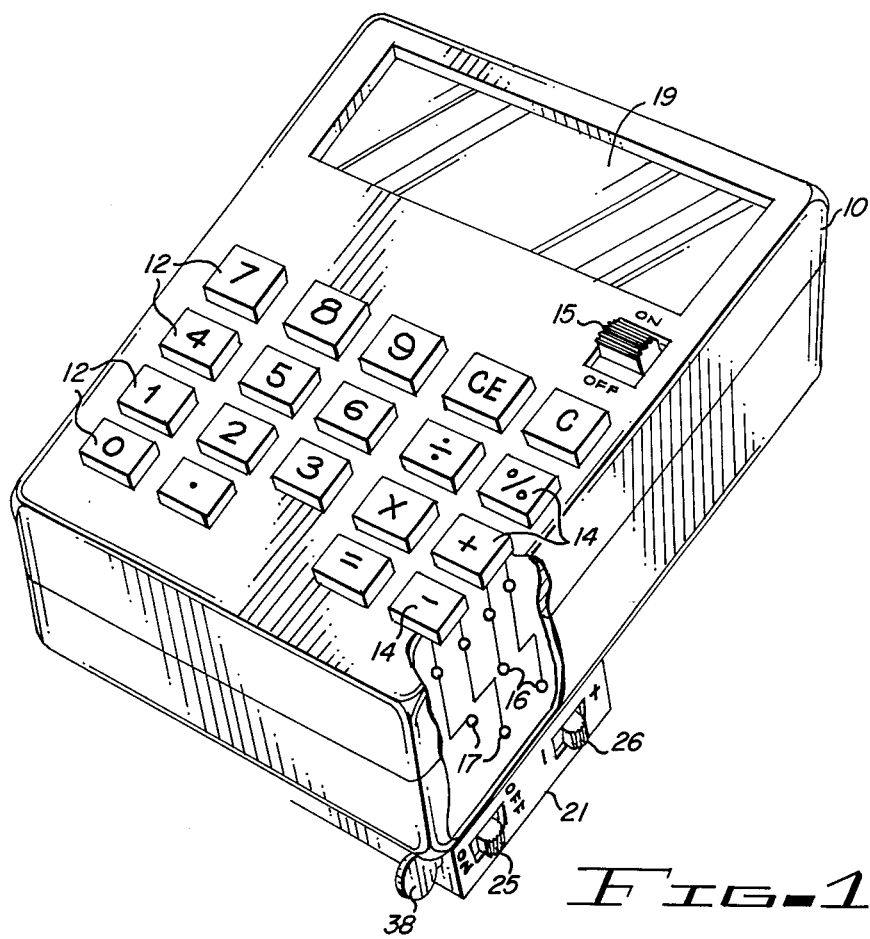
FIG. 1 is a partially cut-away perspective view of a preferred embodiment of the invention.

In the drawings, the same reference numbers are used throughout the several figures to designate the same or similar components.

Referring now to FIG. 1, there is shown a conventional hand-held electronic battery-operated calculator 10 which has been modified to incorporate additional components to convert it to an electronic pedometer. The calculator 10 includes the standard data entry keys 12 and function keys 14 along with a power "on-off" switch 15. All of these components operate in a normal manner to permit use of the calculator to perform arithmetic functions of addition, subtraction, multiplication, division, etc. The calculator 10 preferably includes a memory function of the type commonly employed in calculators currently available on the market.

The electronic circuitry of the calculator 10, its operation and data display in a display area 19 all are conventional, so that no description of the operation of that circuitry is considered necessary here.

Operation of the calculator circuitry in response to the depression of any of the data entry keys 12 or the function keys 14 is controlled by the closure of corresponding switch contacts by the keys whenever the keys 12 and 14 are depressed. The depression of a key 12 or 14 completes an electrical circuit through the switch contacts controlled by the key from a source of power to various parts of the calculator electronic circuitry to effect the desired operation.

As shown in FIG. 1, two of the function keys 14, namely the "add" (+) and "subtract" (−) keys, have the contacts which are bridged by operation of these keys connected in parallel to corresponding pairs of terminals 16 and 17, respectively. These output terminals are terminated in half of a male/female connector set passing through the back 20 of the housing of the calculator 10. Mating contacts of the connector sets coupled to the terminals 16 and 17 are connected to switching circuitry within a pedometer switch box 21 which is attached to the back 20 of the calculator 10 in any suitable manner. Generally, the male/female contact connections with the terminals 16 and 17 to similar mating contacts of the connector sets passing through the box 21 are sufficient to interconnect physically and electrically the box 21 and the calculator 10. The calculator 10 is further modified by the provision of a belt clip 23 to hold the calculator/pedometer combination securely in an upright position to the body of the person using it.

Figure 2:
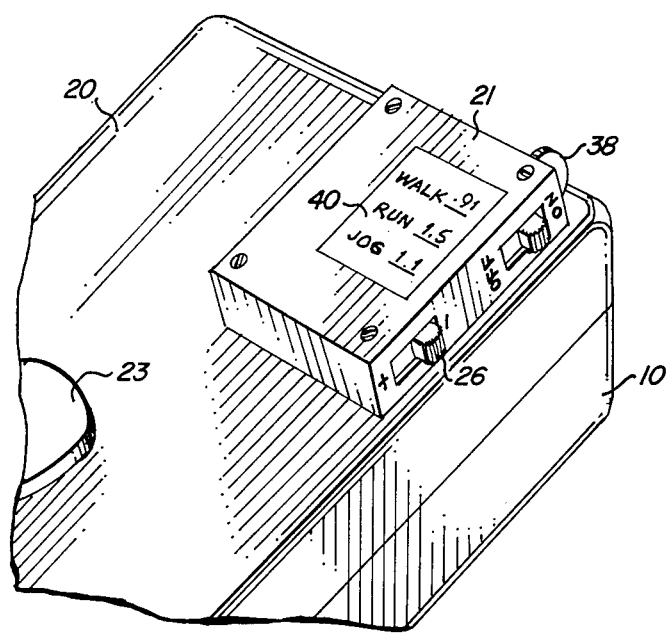
FIG. 2 is a partially cut-away view of the reverse side of the device shown in FIG. 1.
Figure 3:
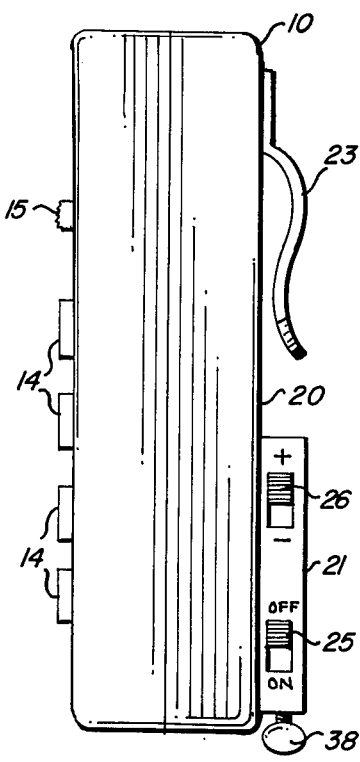
FIG. 3 is a side view of the device shown in FIG. 1.

As shown in FIGS. 1, 2 and 3, the pedometer box 21 has an "on-off" switch 25 and a function selection switch 26 located in a position for convenient access by the user or wearer of the device. The pedometer box 21 has located within it a normally open, impact-actuated switch comprising a first electronically conductive leaf spring 28 with a small weight 29 on its free end for momentary engagement, through a projection 36, with a mating electronically conductive leaf spring switch contact 31. The leaf spring contact 28 is held out of engagement with the contact 31 by a movable fulcrum member 33 which is horizontally adjustable (as shown in FIG. 4) in a track parallel to the length of the leaf spring switch member 28. The effective length of the spring 28 then may be varied in accordance with the horizontal position of the fulcrum 33. Additional adjustment of the spacing between the depending projection 36 carried by the leaf spring 28 and the mating spring contact 31 is effected by a thumbscrew 38 which is used to vertically raise and lower the leaf spring 31 relative to the projection 36. The adjustments of the thumbscrew 38 and the location of the fulcrum 33 are effected to control the impact force necessary to complete an electrical circuit between the projection 36 and the member 31.

As stated previously, this switch is normally open, but when the pedometer is worn on the belt of a user, each step taken by the user causes the weight 29 to be jarred downwardly to move the projection 36 into electrical contact with the projection 31. When this occurs, an electrical circuit is completed through the on-off switch 25, provided it is in its "on" position, completing the circuit to the appropriate contact terminals 16 or 17 in the calculator. Since different persons with different strides or the same person at different times will cause a different downward force to be applied to the weight 29, the members 30 and 38 are adjusted to provide a sure closing of the switch contacts 36 and 31 for each step taken while at the same time preventing multiple closures of the contacts 36 and 31 due to bouncing and the like between steps. Although the member 33 and member 38 both are shown for effecting this adjustment, it may be possible to eliminate one or both of these members for some applications of the device.

FIG. 6 shows the electrical interconnections of the switches 25 and 26 for selecting which set of terminals 16 or 17 the closure of the switch contacts 36 and 31 is to bridge in the calculator 10 in response to use of the pedometer device. If the "on-off" switch 25 is opened ("off"), the pedometer device has no effect whatsoever on the operation of the calculator 10. The calculator 10 then may be used in a conventional manner; and even when it is worn on the belt of the user, operation of the switch contacts 31 and 36 has no effect due to the open circuit provided by the switch 25. If the switch 25, however, is closed ("on") to bridge the contacts shown in FIG. 6, the pedometer portion of the circuit is effective to control operation of the calculator 10.

Ideally, the pulses produced by the momentary closure of the contacts 36 and 31 for each step taken by the wearer of the electronic pedometer will either add a unit representative of that step or subtract a unit representative of that step from some preset number indicative of the distance to be traveled. That is the reason the switch 26 is capable of selecting either the "add" (+) or the "subtract" (−) function key 14. In the position shown in FIG. 6, the operation of the switch contacts 31 and 36 supplies pulses simulating the operation of the "add" function key 14. In the other position of the switch 26 (movement to the left as shown in FIG. 6), the operation of the switch contacts 36 and 31 simulates the operation of the "subtract" function key 14.

In operation of the electronic pedometer, the user initially must walk a measured distance in normal walking steps. For example, assume that a man walks exactly 100 yards in 105 steps. He then uses the calculator 10 to divide 100 yards by the number of steps required to cover the distance, in this case 105, and he writes the results of this division (0.95 to two decimal point accuracy) on an erasable chart 40 on the back of the calculator opposite the word "walk." A similar calculation may be made, if desired, for the number of steps taken to run the same distance and to jog the same distance. Once the calculated entries have been made on the chart 40 opposite the appropriate designations "walk," "run" and "jog," the user then only needs to refer to this chart and enter the appropriate data suitable to the particular activity for which he wishes to measure the distance covered.

For example, assume that the calculation has been made as described above that each step made by the wearer of the electronic pedometer when he is walking covers 0.95 yards. If a distance walked then is to be measured, the user of the calculator programs the calculator by entering the data corresponding to each step, namely 0.95, on the data entry keys 12 in a conventional manner. The switch 26 then is set to the "add" (+) or "subtract" (−) position. For the purpose of this example, assume that it is set to the "add" position as shown in solid lines in FIG. 6 to select the terminals 16 paralleling the contacts of the "add" function switch 14 of the calculator. Once the pedometer "on-off" switch 25 is placed in the "on" position, each subsequent step then taken by the wearer of the electronic pedometer causes a momentary closure of the contacts 36 and 31. This completes a circuit across the contacts of the "add" function switch 14 to add the number previously selected by operation of the data entry keys 12 each time the switch contacts 36 and 31 close. Thus, each step causes 0.95 to be added to the running total displayed in the display 19 of the pedometer so long as it is in use. The display 19 may be observed when desired by the wearer of the pedometer who then can determine precisely how far he has gone.

Similarly, if the total distance from a starting point to a finishing point is known, this distance first may be entered by operation of the appropriate data entry keys 12 into the calculator 10 for display on the display 19. Then the number for the distance covered by each step (0.95) is entered as described above. The switch 26 is moved to its "subtract" position (to the left as shown in FIG. 6) to select the terminals 17 for control by the switch contacts 36 and 31. Operation of the device is the same as described previously; but in this case, 0.95 is subtracted from the running total for each step taken by the wearer. The indication in the display 19 then is indicative of the number of yards remaining to the finishing point.

An alternative to the foregoing is to merely use the electronic pedometer to count the number of steps taken by the user. In this case, the data entry key for the number "1" is initially selected, so that each step taken by the user then adds "1" or subtracts "1" as the user walks along. If the pedometer is operated in this fashion, it then is necessary to multiply this total by the appropriate constant representative of the length of a stride to obtain the distance traveled or to obtain the number which is to be subtracted from a preset total. Since this latter operation involves additional steps of computation by the user, it is considered less desirable than the previously described operation which directly enters and adds or subtracts the precise amount of distance covered by each step of the user.

Although the foregoing description has been directed to calculation of distance covered in terms of yards, it is readily apparent that comparable measurements in terms of feet or other units may also be effected. If another person, with a different stride, wishes to use the electronic pedometer, it is necessary for him to first determine the appropriate constant corresponding to the length of his stride in the same manner as described previously. This constant then may be entered on the data entry keys 12; and the operation of the pedometer is the same, except that a different number (for example, perhaps 0.89) is added or subtracted as the constant representative of the stride of this different person using the device. The manner in which the appropriate constant for a user is initially determined is relatively simple and does not require much time to perform. The accuracy with which the device records distances is considerably greater than that which is attainable by the rough adjustments possible with mechanical pedometer devices currently available. In addition, the calculator 10 may be used in the conventional manner at any time the user wishes.

FIGS. 7 and 8 illustrate alternative embodiments in which the calculator 10, modified as shown in FIGS. 1 through 6, may be used to measure distances covered by a golf cart or other vehicle. In this case, the switch contacts 36 and 31 are replaced with a normally open switch 50 (FIG. 8) which is closed in response to operation of a cam follower 51 under the control of a cam 55 located on a rotating shaft 57 connected to the wheel, for example, of the golf cart or other vehicle. The terminals of the switch 50 then are connected to terminals of a corresponding switch 126 (similar to the switch 26) which is used to select the "add" or "subtract" function key 14. In all other respects, the entry of appropriate data into the calculator 10, including the constant representative of distance traveled between each closure of the switch 50 is the same as described for the pedometer version of FIGS. 1 through 6.

The electronic distance-measuring device described above and shown in the drawings is a convenient adaptation of a conventional electronic calculator which may be effected easily at minimum cost. It is a very accurate distance-measuring device compared with other presently available devices for accomplishing similar purposes and expands the use of the calculator 10 into an entirely new area of practical applications.

I claim:

1. A pedometer device to be carried on the person of the user including in combination:
   electronic calculator means programmable by the user for entering predetermined data in response to input pulses;
   stride actuated switch means operated in response to steps taken by the user indicative of units of distance; and
   pulse supply means controlled by said stride actuated switch means for producing input pulses in response to the operation of said switch means and connected with said electronic calculator means for supplying said input pulses thereto indicative of units of distance covered.

2. The combination according to claim 1 where said stride actuated switch means completes an electrical circuit through said pulse supply means to cause said pulse supply means to produce one of said pulses at each step taken by a person carrying the pedometer device.

3. The combination according to claim 1 wherein said electronic calculator means comprises a keyboard having at least some data entry keys and function keys therein for completing electrical circuits to supply pulses to calculator circuitry, and said pulse supply means includes circuit means connected in parallel with the contacts of at least one of the keys of said calculator and operation of said stride actuated switch means completes an electrical circuit in said parallel circuit.

4. The combination according to claim 3 wherein said circuit means comprises a series circuit connected across the contacts of at least one of the function keys of said electronic calculator means, said series circuit comprising said stride actuated switch means and first "on-off" switch closed to complete a circuit therethrough in the "on" position and opened to break electrical connection therethrough in the "off" position, and said stride actuated switch means is a normally open switch which is momentarily closed in response to each step taken by the user of said pedometer device, said calculator means being operable to perform other calculating functions with said first "on-off" switch means in the "off" position.

5. The combination according to claim 4 wherein said stride actuated switch means comprises a weighted balance-arm switch closed in response to the impact movement imparted to the pedometer device at each step taken by a person carrying said device.

6. The combination according to claim 5, further including means for adjusting the sensitivity of said step-actuated switch.

7. The combination according to claim 4, further comprising third switch means coupled to selectively connect said pulse supply circuit means in parallel with the contacts of different function keys of said calculator means.

8. The combination according to claim 3 wherein said different function keys of said calculator means comprise the "add" and "subtract" function keys thereof.

* * * * *